United States Patent [19]
Kashida et al.

[11] Patent Number: 5,148,331
[45] Date of Patent: Sep. 15, 1992

[54] ROTARY HEAD TYPE RECORDING AND REPRODUCING APPARATUS FOR INFORMATION AND ADDITIONAL CODES

[75] Inventors: Motokazu Kashida, Tokyo; Masahiro Takei, Kanagawa; Kouji Takahashi, Kanagawa; Kenichi Nagasawa, Kanagawa, all of Japan

[73] Assignee: Canon Kabushiki Kaisha, Tokyo, Japan

[21] Appl. No.: 600,133

[22] Filed: Oct. 19, 1990

Related U.S. Application Data

[63] Continuation of Ser. No. 323,090, Mar. 13, 1989, abandoned, which is a continuation of Ser. No. 820,680, Jan. 21, 1986, abandoned.

[30] Foreign Application Priority Data

Jan. 25, 1985 [JP] Japan .................. 60-013179
Jan. 25, 1985 [JP] Japan .................. 60-013180

[51] Int. Cl.⁵ ............... G11B 5/584; G11B 5/02; G11B 15/467
[52] U.S. Cl. ................... 360/77.15; 360/18; 360/27; 360/32; 360/73.05; 360/70
[58] Field of Search ........... 360/8, 9.1, 10.1–10.3, 360/13–14.3, 18–20, 27, 31, 32, 40, 69–72.2, 73.04–73.14, 74.1, 74.4, 76, 75, 77.12–77.17

[56] References Cited

U.S. PATENT DOCUMENTS

| | | | |
|---|---|---|---|
| 4,558,378 | 12/1985 | Shibata et al. | 360/19.1 |
| 4,568,986 | 2/1986 | Furuhata et al. | 360/73 |
| 4,573,089 | 2/1986 | Moeda et al. | 360/77 |
| 4,602,298 | 7/1986 | Nishitani et al. | 360/14.1 |
| 4,622,600 | 11/1986 | Okamoto et al. | 360/32 |
| 4,651,239 | 3/1987 | Omori et al. | 360/77 |
| 4,656,539 | 4/1987 | Sugiki et al. | 360/77 |
| 4,665,447 | 5/1987 | Odaka | 360/77 |
| 4,769,722 | 9/1988 | Itoh et al. | 360/27 |

FOREIGN PATENT DOCUMENTS 60-258749 12/1985 Japan .................. 360/27

Primary Examiner—Aristotelis Psitos
Assistant Examiner—Steven R. Garland
Attorney, Agent, or Firm—Robin, Blecker, Daley & Driscoll

[57] ABSTRACT

A rotary head type recording and reproducing apparatus of the kind recording information codes on a tape-shaped recording medium by forming many parallel recording tracks and at the same time an additional code consisting of one byte at a predetermined position in each of the recording tracks and reproducing, by means of rotary heads, the signals from the medium, the apparatus is arranged to perform the reproduction as follows; A tracking error signal is formed by using signals reproduced from the rotary head. The tracking error signal is sampled at such a timing that enables the rotary head to reproduce the additional code. The position of the recording medium relative to the rotary head is controlled on the basis of the tracking error signal thus obtained.

14 Claims, 10 Drawing Sheets

ROTARY HEAD TYPE RECORDING AND REPRODUCING APPARATUS FOR INFORMATION AND ADDITIONAL CODES

This application is a continuation, of application Ser. No. 323,090, filed Mar. 13, 1989, now abandoned, which is a continuation of application Ser. No. 820,689, filed Jan. 21, 1986, now abandoned.

BACKGROUND OF THE INVENTION

1. Field of the Invention

This invention relates to a rotary head type recording and reproducing apparatus and more particularly to an apparatus arranged to record main information signals on a tape-shaped recording medium by forming many parallel recording tracks with an additional information signal recorded solely at a predetermined part of each of the recording tracks; and to reproduce these recorded signals by means of rotary heads.

2. Description of the Prior Art

In this specification, among the apparatuses of the kind mentioned above, audio tape recorders arranged to record audio signals as main information signals by time-base compressing them and by digitally modulating them with rotary heads are taken up by way of example in describing this invention.

FIG. 1 of the accompanying drawings shows by way of example the tape transport system employed in the audio tape recorder of the above-stated kind. The illustration includes a magnetic tape 1; a rotary cylinder 2 which carries a pair of rotary heads 3 and 4. The heads 3 and 4 are thus arranged to obliquely trace the surface of the tape 1 in recording an audio signal on the tape. An audio signal tape recorder capable of exclusively recording audio signals in a total of six channels can be obtained by arranging it to record a time-base compressed audio signal in each of six areas formed on the tape 1 in the longitudinal direction thereof every time these heads 3 and 4 rotate 36 degrees.

The following briefly describes this tape recorder:

FIG. 1 shows the tape transport system of the above-stated tape recorder. FIG. 2 shows recording tracks formed on a tape by this tape recorder. While the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein respectively. An operation called azimuth-overwrite is performed on these areas. However, the tracks of these areas CH1–CH6 do not have to be on the same straight line. Each of the areas CH1–CH6 has one pilot signal recorded therein for tracking control. Different pilot signals are thus recorded in different areas in the order of rotation f1→f2→f3→f4. However, there is no correlation between them.

Referring further to FIG. 1, recording or reproduction is carried out in or from these areas CH1 to CH3 while the tape 1 is travelling at a predetermined speed in the direction of arrow 7 and in or from the areas CH4 to CH6 while the tape is travelling in the direction of arrow 9. Therefore, as shown in FIG. 2, the inclination of the areas CH1 to CH3 somewhat differs from that of the areas CH4 to CH6. With regard to a difference in the relative speed of the tape and the head for these groups of areas, a difference arising from the travel of the tape 1 is extremely small as compared with a difference arising from the rotation of the heads 3 and 4. Therefore, the difference in the relative speed presents no problem.

FIGS. 3(a) to 3(j) show in a time chart the recording or reproducing operation of the tape recorder which is arranged as described above. A phase detection pulse (hereinafter referred to as a PG signal) which is generated in synchronism with the rotation of the cylinder 2 as shown at FIG. 3(a). The PG signal is of a rectangular wave of 30 Hz repeating a high level (hereinafter referred to as an H level) and a low level (hereinafter referred to as an L level) alternately with each other at intervals of 1/60 sec. Another PG signal which is of the opposite polarity to the PG signal of FIG. 3(a) is shown in FIG. 3(b). The first PG signal is at an H level while the head 3 is rotating from the point B to the point G of FIG. 1. The other PG signal shown in FIG. 3(b) is at an H level while the other head 4 is rotating from the point B to the point G.

Pulses for reading data are obtained from the PG signal of FIG. 3(a) as shown in FIG. 3(c). The data reading pulses are used for sampling the audio signal of a period corresponding to one field (1/60 sec). FIG. 3(d) shows by H level parts thereof periods provided for signal processing on the one field portion of the sampled audio data by adding an error correcting redundant code or by changing the arrangement thereof by means of a RAM or the like. FIG. 3(e) shows a signal indicating data recording periods at H level parts thereof which represent timing for recording, on the tape 1, the recording data obtained through the signal processing operation mentioned above.

Referring to FIGS. 3(a) to 3(j), the temporal flow of signals are, for example, as follows: The data sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time t6, or while the head 3 is moving from the point A to the point B. In other words, the data is recorded by the head 3 in the area CH1 as shown in FIG. 2. Meanwhile, the data which is sampled while the PG signal of FIG. 3(b) is at an H level is also processed at a similar timing before it is recorded in the area CH1 by the head 4.

FIG. 3(f) shows another PG signal which is obtained by shifting the phase of the PG signal of FIG. 3(a) to a predetermined degree, which corresponds to one area and is 36 degrees in this specific instance.

An audio signal recording operation using the PG signal of FIG. 3(f) and a PG signal which is not shown but is of an opposite polarity to the former is performed in the following manner: The data which is sampled during a period between the points of time t2 and t4 is subjected to a signal processing operation during a period between the points of time t4 and t6 in accordance with the signal of FIG. 3(g) and is recorded during a period between the points of time t6 and t7 in accordance with the signal of FIG. 3(h). In other words, the data is recorded in the area CH2 of FIG. 2 while the head is moving from the point B to the point C. Meanwhile, another data which is sampled during the points of time t4 and t7 is likewise recorded in the area CH2 by means of the other head during a period between the points of time t4 and t7.

The signal which is recorded in the area CH2 in the manner as described above is reproduced in the following manner:

The head 3 reads the data from the tape 1 in accordance with a signal shown in FIG. 3(h) during the period between the points of time t6 and t7 (and also during the period between the points of time t1 and t2). Then, during the period between the points of time t7 and t8 also (between t2 and t3), the reproduced signal is subjected to a signal processing operation which is carried out, in a manner reverse to the signal processing operation performed for recording, in accordance with a signal shown in FIG. 3(i). In other words, error correction and other processes are carried out during this period. Then, during a period between points of time t8 and t9, the reproduced audio signal which has been thus processed is produced in accordance with a signal shown in FIG. 3(j). The reproducing operation of the head 4 is of course performed with a phase difference of 180 degrees from the above-stated reproduction by the head 3, so that a continuous reproduced audio signal can be obtained.

For other areas CH3 to CH6, it goes without saying that the recording and reproducing operations are performed on the basis of the PG signal of FIG. 3(a) by phase shifting it as much as n×36 degrees. This is independent of the travelling direction of the tape.

The tape recorder of the type operating in the manner as described above can be readily arranged to be capable of recording audio signals for a length of time of, for example, 90 minutes in each area and thus can be arranged to perform audio signal recording over such a long period as nine hours. This, however, brings about a problem on the part of the operator that an excessively long period of time becomes necessary in searching out a desired part of the record on the tape. It is conceivable to solve this problem by having indexing data generated and recorded as an auxiliary information signal in recording data corresponding to the audio signal.

However, the searching efficiency cannot be increased if the indexing data are used by reproducing them at the same tape travel speed as the speed employed for recording. Meanwhile, an increased travelling speed of the tape would make it difficult to reproduce the indexing data recorded.

Further, during recent years, rotary head type recording apparatuses such as video tape recorders (hereinafter referred to as VTR) and digital audio tape recorders (hereinafter referred to as DAT) have come to be arranged to perform recording with further increased recording density. As a result of this trend, some of these apparatuses have come to record signals with recording tracks arranged to be formable at a plurality of different track pitches. In the apparatuses of this kind, the recording track pitch (hereinafter referred to as TP for short) is normally determined by the travelling speed of the recording medium at which recording is performed. In the case of a VTR, for example, the recording travelling speed of the tape is arranged to be variable between a larger track pitch recording/reproducing speed (called a standard mode speed which hereinafter will be referred to simply as the SP mode) and a smaller track pitch recording/reproducing speed (called a long time mode speed which hereinafter will be referred to simply as the LP mode). The SP mode speed is faster than the LP mode speed by about 2 to 3 times.

At the time of reproduction of the record, the apparatuses of this kind necessitates making a discrimination between the SP and LP mode recording speeds. For this purpose, the conventional VTR is arranged to form a control track which extends in the longitudinal direction of the tape with a control signal of a given frequency recorded in this track. Then, at the time of reproduction, this control signal is reproduced to make a discrimination between the SP and LP modes according to the frequency of the control signal reproduced. However, it is a short-coming of the apparatus of this kind that the additional track separately formed in the longitudinal direction of the tape hinders efforts to further increase the recording density. This shortcoming presents a serious problem especially in the case of the apparatus arranged to perform recording and reproduction by longitudinally forming a plurality of areas along a tape-shaped recording medium, because, in that instance, the longitudinal, separately formed recording track must be formed also in a plural number which is hardly practicable.

Another method has been contrived for making a discrimination between the SP and LP modes by utilizing a signal recorded in a helical recording track in which an information signal is recorded. For example, tracking control pilot signals (hereinafter referred to as TPS's) which are reproduced are used for this purpose. The TPS's are, for example, recorded in a manner called the four frequency method. According to the conventional method, the discrimination between the SP and LP modes is made either by detecting how many different frequencies of these TPS's have been reproduced in a certain given period of time or by detecting the frequency of a tracking error signal obtained from the reproduced TPS's. However, it is difficult to apply this method to an apparatus of the kind which forms a plurality of areas extending in the longitudinal direction of a tape-shaped recording medium and performs recording and reproduction in and from each of these longitudinal areas, because: The reproducible level of the TPS is not so high. Besides, the recording track pitch of one of these areas might differ from that of another area. This necessitates sampling for each of the areas. These factors thus present a problem for detection by means of the TPS's. Even if this problem can be solved, in the event of an apparatus of the type permitting selection of more than three different recording track pitches, a discrimination of one track pitch from another not only necessitates an extremely complex circuit arrangement but also is very difficult. Therefore, such a method is hardly applicable to the apparatus of that type.

SUMMARY OF THE INVENTION

The present invention has stemmed from the background described. It is therefore an object of this invention to provide a rotary head type recording/reproducing apparatus which is capable of solving the above-stated problems of the prior art.

It is another object of this invention to provide a rotary head type recording and reproducing apparatus which is capable of reproducing without fail, from a recording medium, an auxiliary information signal recorded at a predetermined part in each of recording tracks formed on the medium.

To attain this object, a rotary head type recording and reproducing apparatus arranged as an embodiment of this invention comprises: recording means for recording signals while forming many recording tracks in parallel on a tape-shaped recording medium, the signals including a main information signal recorded in each of the tracks and an additional information signal recorded at a predetermined part in each of the tracks; reproducing means for reproducing signals from the recording medium, the reproducing means including at least one rotary head; means for forming a tracking error signal from signals reproduced by the rotary head; sampling means which is capable of sampling the tracking error signal at a timing when the rotary head traces the part at which the additional information signal is recorded; and control means for controlling the relative positions of the recording medium and the rotary head according to the tracking error signal sampled by the sampling means.

It is a further object of this invention to provide a rotary head type recording apparatus which is capable of recording many different data as additional information along with a main information signal.

To attain that object, a rotary head type recording apparatus arranged as another embodiment of this invention comprises: recording means which includes at least one rotary head and is arranged to record signals while forming many recording tracks in parallel on a tape-shaped recording medium; means for forming main data by digitizing a main information signal; sub-data forming means for selectively producing one of a plurality of different additional information data including a first additional information data and a second additional information data for each period during which one recording track is formed by the recording means; and recording data supply means arranged to form recording data from the main data and the sub-data and to supply the recording means with the recording data in such a manner as to have the sub-data recorded at a predetermined part in each of the recording tracks.

These and further objects and features of this invention will become apparent from the following detailed description of a preferred embodiment thereof taken in connection with the accompanying drawings.

DETAILED DESCRIPTION OF THE PREFERRED EMBODIMENTS

Figure 1:
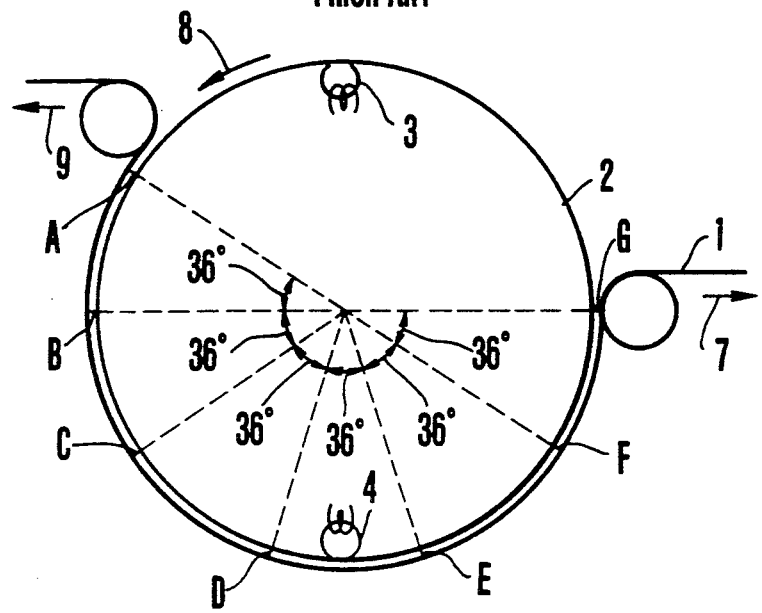
FIG. 1 schematically shows the tape transport system of the conventional tape recorder to which an embodiment of this invention is related.
Figure 2:
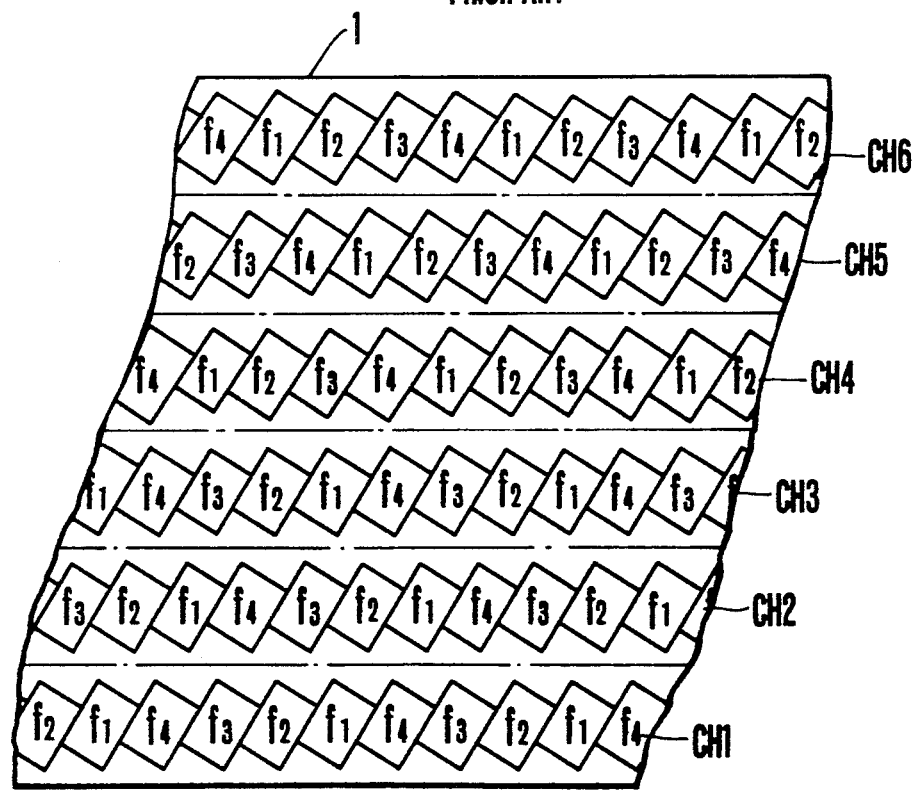
FIG. 2 shows the recording format of the tape recorder shown in FIG. 1.
Figure 3:
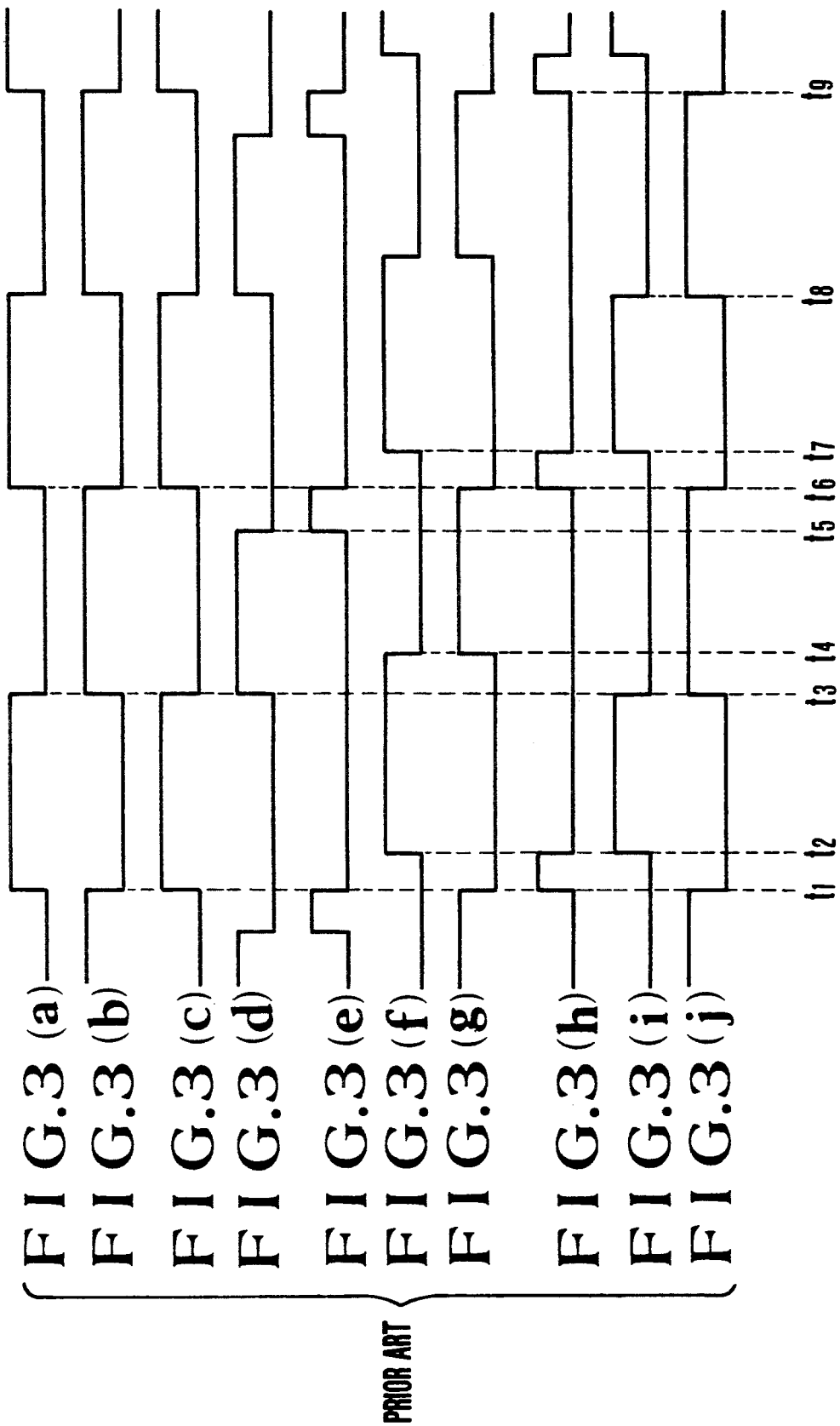
FIGS. 3(a) to 3(j) jointly form a timing chart showing the recording and reproducing operation timings of the tape recorder shown in FIG. 1.
Figure 4:
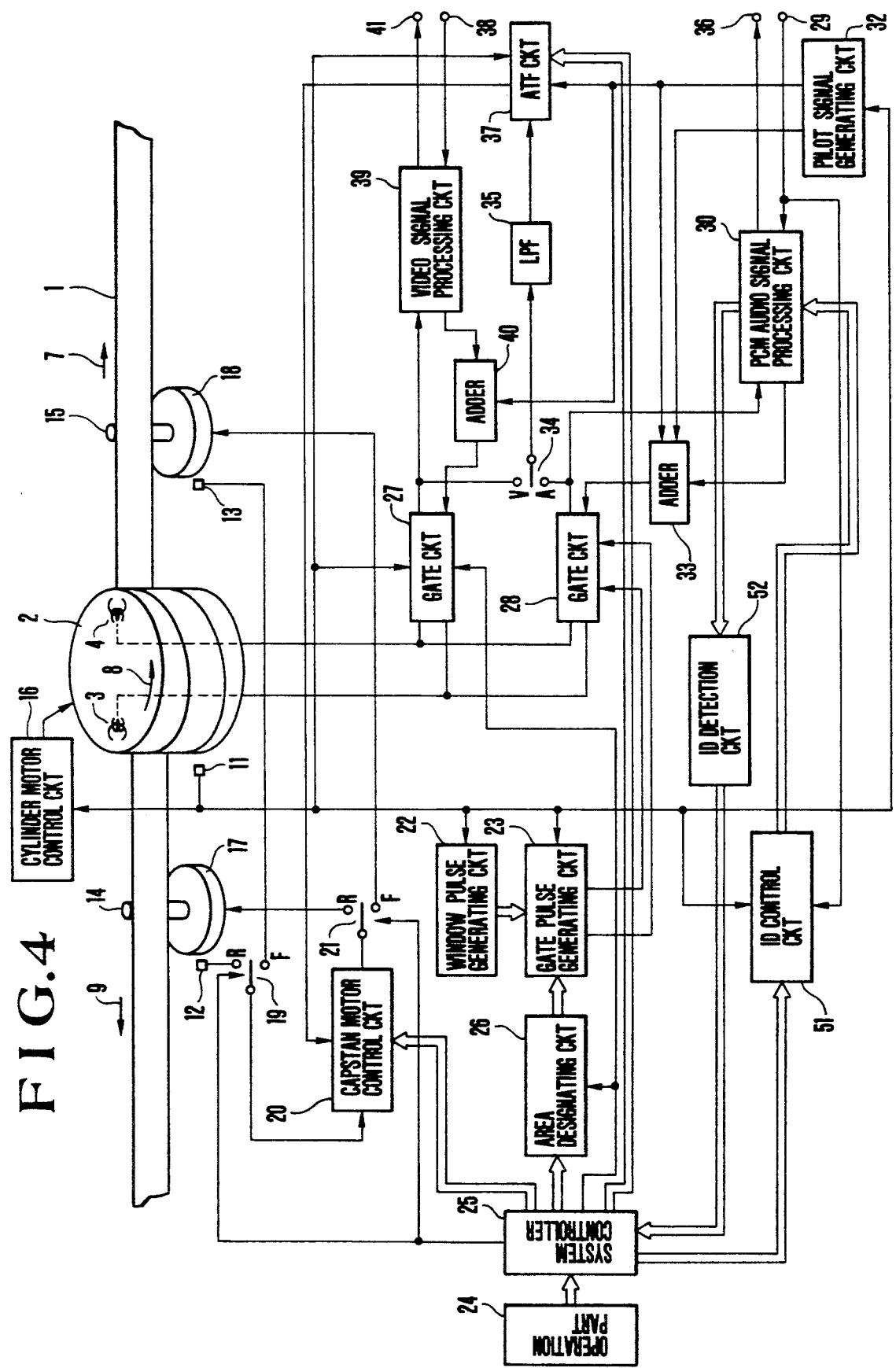
FIG. 4 is a block diagram showing in outline the arrangement of a tape recorder arranged according to this invention as an embodiment thereof.

FIG. 4 shows in outline the arrangement of a tape recorder which is of the kind described in the foregoing and to which this invention is applied as an embodiment thereof. In FIG. 4, the components which are similar to those shown in FIGS. 1 and 2 are indicated by the same reference numerals. A PG signal which is obtained from a detector 11 for detecting the rotation of a rotary cylinder is supplied to a cylinder motor control circuit 16. The control circuit 16 causes the cylinder 2 to be rotated at a given rotating speed and also at a given rotating phase. Rotation detectors 12 and 13 are arranged to detect the rotation of the fly-wheels 17 and 18 of capstans 14 and 15 respectively. One of the outputs of these detectors 17 and 18 is selectively supplied to a capstan motor control circuit 20 (hereinafter this output will be referred to as FG signal). During recording, the output of the capstan motor control circuit 20 is supplied via a switch 21 to capstan motors as applicable to cause the capstans 14 and 15 to be rotated at a predetermined speed. Switches 19 and 21 are arranged to be in their connecting positions at terminals F of them in causing a tape 1 to travel in the direction of arrow 7 (forward) and to be in their positions at their other terminals R in causing the tape to travel in the direction of arrow 9 (reverse).

Meanwhile, the above-stated PG signal is supplied also to a window pulse generating circuit 22 and a gate pulse generating circuit 23. An operation part 24 is arranged to permit a manual operation thereon for selecting a recording or reproducing operation mode and for designating an area on which recording or reproduction is to be performed. The operation part 24 also permits selection between recording only an audio signal and recording not only an audio signal but also a video signal in accordance with the recording pattern which is shown in FIG. 2. The data of such designation or selection are supplied to a system controller 25. The system controller 25 is arranged to control the capstan motor control circuit 20, switches 19 and 21, an area designation circuit 26, a gate circuit 27, an ID control circuit 51, etc. The area designation circuit 26 is arranged to supply area designation data to a gate pulse generating circuit 23 for obtaining a desired gate pulse. In cases where a video signal is also to be recorded along with an audio signal, the area to be designated is of course the area CH1.

In accordance with the area designation data, the gate pulse generating circuit 23 is arranged to selectively supply one of window pulses generated by a window pulse generating circuit 22 to a gate circuit 28 for each of the heads 3 and 4 as applicable.

During recording, an analog audio signal coming from a terminal 29 is supplied to a PCM audio signal processing circuit 30. This incoming audio signal is sampled at a timing relative to the window pulse and is converted into a digital data. The digital data thus obtained is further subjected to a signal processing operation mentioned above. Further, along with the audio data, there is generated additional information data (hereinafter referred to as ID data) which will be described later herein. Recording audio data which is obtained in this manner is supplied to an adder 33 to be added together with TPS's which are produced, one for every field, from a pilot signal generating circuit 32 in rotation in the order of frequencies f1→f2→f3→f4 and another pilot signal which will be described later. The output of the adder 33 is suitably gated by the gate circuit 28 as mentioned above to be written in desired one of the areas by means of the heads 3 and 4.

During reproduction, signals reproduced by the heads 3 and 4 are extracted by the gate circuit 28 according to the window pulse. The reproduced signal thus obtained is supplied via the terminal on the side A of a switch 34 to a low-pass filter 35 (hereinafter referred to as LPF) and is supplied also to the PCM audio signal processing circuit 30. At the PCM audio signal processing circuit 30, unlike in the case of recording, a signal processing operation is performed including error correction, time-base expansion, digital-to-analog conversion, etc. Upon completion of the signal processing operation, the circuit 30 produces a reproduced analog audio signal from a terminal 36.

The LPF 35 separates each of the above-stated TPS's and supplies it to an ATF circuit 37. The ATF circuit 37 is arranged to obtain a tracking error signal by a known four frequency method. As well known, the tracking error signal is obtained by using the reproduced tracking control pilot signals and other pilot signals which are generated by a pilot signal generating circuit 32 in the same rotation of frequencies as the pilot signals generated during recording. The tracking error signal is, in this instance, obtained for each of the areas. Therefore, these tracking error signals are sampled and held at timing points in a manner as will be described in detail later. Each of the tracking error signals is supplied to the capstan motor control circuit 20. The travel of the tape 1 under the reproducing operation is thus controlled through the capstans 14 and 15 for tracking control.

The arrangement of the embodiment for recording and reproducing a video signal is as follows: When the system controller 25 gives an instruction to record a video signal, the area designating circuit 26 compulsorily designates the area CH1. Then, the gate circuit 27 is caused to operate according to the PG signal. A video signal coming via a terminal 38 is processed by a video signal processing circuit 39 into a signal form suited for recording. The processed video signal is then supplied to an adder 40 to be added together with the pilot signals obtained from the pilot signal generating circuit 32. A recording signal thus obtained is supplied via the gate circuit 27 to the heads 3 and 4 to be recorded in an applicable part of the areas CH2 to CH6. Meanwhile, the PCM audio signal is recorded in exactly the same manner as described in the foregoing.

At the time of reproduction, video signals picked up by the heads 3 and 4 are combined into a continuous signal through the gate circuit 27. The continuous signal is supplied to the video signal processing circuit 39 to be brought back into the original signal from before it is produced from a terminal 41. Further, the continuous signal obtained via the gate circuit 27 is supplied also to the LPF 35 via the terminal V of a switch 34. The LDF 35 separates the pilot signal components of the continuous signal and supplies these components to the ATF circuit 37 in a continuous manner. In this instance, the tracking error signal obtained from the ATF circuit 37 is not required to be sampled and is thus allowed to be supplied to the capstan motor control circuit 20 as it is. Further, at that time, the PCM audio signal which is recorded in the area CH1 is also reproduced and a reproduced analog audio signal is obtained from a terminal 36. However, in this instance, the tracking control by means of the output signal of the gate circuit 28 is not performed.

Figure 5:
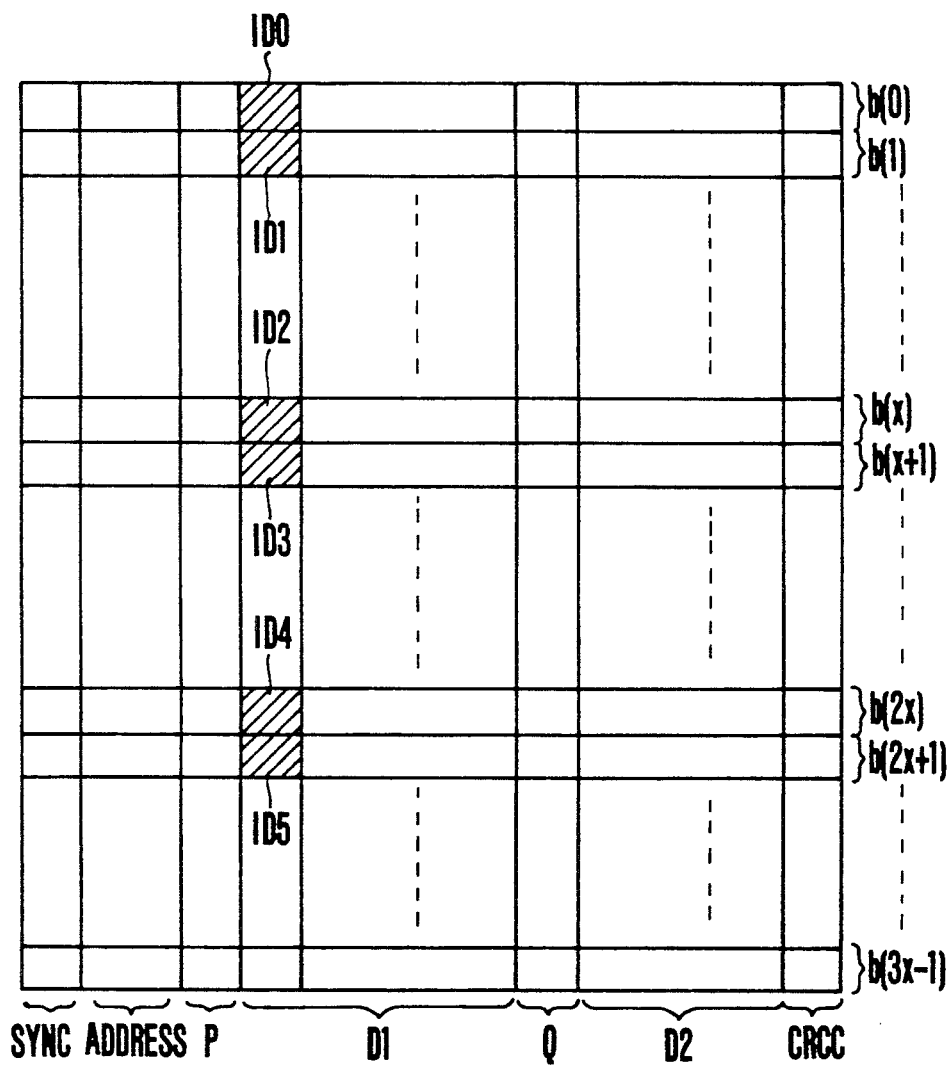
FIG. 5 shows a data matrix for description of the recording data format of the tape recorder arranged as the embodiment of this invention.

Next, a data format which is applicable to this embodiment is described by way of example as follows: FIG. 5 is a data matrix showing a format of the data to be recorded within one track of each of the areas. In other words, FIG. 5 shows a data format including the PCM audio data corresponding to the audio signal of two channels obtained in 1/60 sec. Referring to the data matrix illustration of FIG. 5, the illustration includes a synchronizing data column SYNC; an address column ADDRESS; error correcting redundant data columns P and Q; a known CRCC check code column CRCC; and data columns D1 and D2. Each of the data columns D1 and D2 consists of a plurality of data columns including the audio signal information of two channels. The illustration further includes lines b(0) to b(3x−1). Each of these lines forms a data block consisting of data which are recorded one after another from left to right. For example, the data of the synchronizing data column SYNC of the line b(0) is followed by the data of the address data column ADDRESS of the same line b(0), by the data of the column P of the line b(0) and so on. Then, the data of the last column of the line b(x) is followed by the data of the column SYNC of the next line b(x+1). The process of recording the data for one track comes to an end when the data of the last column of the line b(3x−1) is recorded.

Among the columns included in the column D1, the six data ID0 to ID5 of the first column in the six lines b(0), b(1), b(x), b(x+1), b(2x) and b(2x−1) contain information other than audio signal information. These data ID0 to ID5 are arranged to be as described below with reference to Tables 1 and 2:

TABLE 1

| Mode | ID0 | ID1 | ID2 | ID3 | ID4 | ID5 | Remarks |
|---|---|---|---|---|---|---|---|
| 1 | 1 | hour | minute | second | file No. | Y | counter |
| 2 | 2 | pro. No. | cut No. | minute | second | Y | cut data |
| 3 | 3 | year | month | day | day of the week | Y | time |
| 4 | 4 | o'clock | minute | second | file No. | Y | time |
| 5 | 5 | pro. No. | hour | minute | second | Y | pro. data |
| 6 | 6 | pro. No. | hour | minute | second | Y | tape data |
| 7 | 7 | X | — | — | — | Y | new ID |

TABLE 2

| Bit No. | ID5 (Y) in each mode | ID1 (X) in mode 7 |
|---|---|---|
| 1 | validity | validity |

TABLE 2-continued

| Bit No. | ID5 (Y) in each mode | ID1 (X) in mode 7 |
| --- | --- | --- |
| 2 | audio signal form | tape travelling direction |
| 3 | audio signal form | next track number |
| 4 | L ch audio/others | next track number |
| 5 | R ch audio/others | next track number |
| 6 | recording start part | track pitch |
| 7 | recording end part | track pitch |
| 8 | prevention of dubbing | part corresponding to mute part |

The data ID0 which consists of 8 bits is arranged to show the kind of information to which each of other data ID1 to ID5 corresponds (hereinafter the data ID0 will be referred to as the mode designation data). Each of the data ID1 TO ID4 in each of the modes 1 to 6 represents the information as shown in Table 1. In the mode 1, the data ID1 to ID4 show time information as a tape counter. In mode 2, they show time information for each cut. In modes 3 and 4, they show time information. In the mode 5, they show time information for each of different programs. In the mode 6, they show information on time from the leader portion of each tape.

Table 1 includes program numbers pro. No., cut numbers cut No. and file numbers file No. Generally, in the case of a system where data are arranged to become all zero data when there arise data errors, it is desirable to make arrangement to reduce occurrences of all zero data as much as possible. Therefore, in that event, each data is preferably arranged to replace "0" with all "1" (11111111) and to replace "1" with 11111110. In other words, data are arranged to have their normal "0" and "1" conversed and inverted, 0←→1.

Table 2 shows the information indicated by the 8-bit data X and Y of Table 1. The data Y represent the information of the data ID5 in each of the modes 1 to 7. The first bit of this data Y indicates whether the 8-bit data Y is valid or not. The second and third bits of the data Y are arranged to indicate the form of the audio signal, that is, whether the audio information of the signal is monaural or stereophonic or the like. The fourth and fifth bits are arranged to indicate whether audio signal information or some other information is to be recorded in the applicable parts of the first and second channels respectively. The sixth and seventh bits are arranged to become "1" at the beginning and at the end of recording the audio signal respectively. The eighth bit is arranged to be "1" in case where it is desired to prevent dubbing.

Meanwhile, the 8-bit data X contains information related to this invention As shown in Table 2, it includes the following information: The first bit is arranged to indicate whether or not the data X is valid In the event of occurrence of a data error, it is desirable, as mentioned above, for a system of the kind having the data become all "0" in that event, to have the first bit become "0" to indicate the invalidity of the data. The second bit of the data X is arranged to indicate the direction in which the tape travels for recording. The third, fourth and fifth bits of the data X are arranged to indicate which of the areas CH1 to CH6 are to be used next for recording or to indicate that the recording is to be brought to a stop. In other words, each of them indicates a next track number. The sixth and seventh bits of the data X are arranged to indicate the pitch of the recording tracks which are mentioned in the foregoing. The eighth bit of the data X is arranged to become "1" only for a part corresponding to a mute part for the purpose of searching out the leader portion of the signal.

For example, if the level of an analog audio signal coming from the terminal 29 remains close to zero level over a given period of time, the eighth bit of the data X becomes and remains at "1" for a given period of time, corresponding to a predetermined number of recording tracks.

Figure 6:
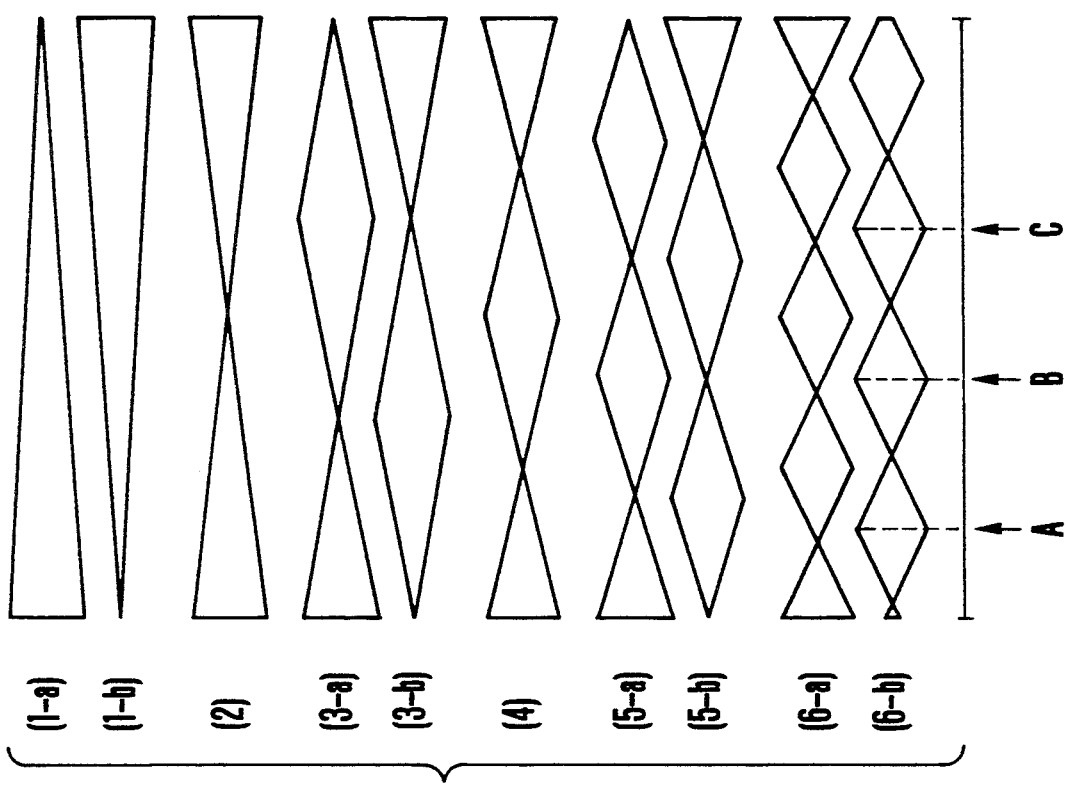
FIG. 6 is an illustration of the travelling speed of a tape in relation to the reproduction output obtained from each of recording tracks.

The reproduction of this data X with the tape allowed at a high speed is as follows:

FIG. 6 shows the reproduction output in relation to the travelling speed of the tape. In FIG. 6, parts (1-a) to (6-b) represent the envelope wave forms of the reproduced output signals obtained with the tape allowed to travel at high speeds. The wave forms (1-a) and (1-b) are obtained at tape travelling speeds which are 6 times and −4 times as high as the tape speed employed for recording. The wave form (2) is obtained at a speed 11 times or −9 times as high as the recording speed. The wave forms (3-a) and (3-b) are obtained at speeds 16 times and −14 times as high as the recording speed. The wave form (4) is obtained at a speed 21 times or −19 times as high as the recording speed. The wave forms (5-a) and (5-b) are obtained at speeds 6 times and −24 times as high as the recording speed. The wave forms (6-a) and (6-b) are obtained at speeds 41 times and −39 times as high as the recording speed.

Generally, in reproducing signals recorded in tracks alternately with the head 3 which has an azimuth angle of $+\theta°$ and another head 4 which has an azimuth angle of $-\theta°$ in a manner called azimuth overlapping writing, the envelope wave forms of the heads 3 and 4 come to coincide with each other when the tape is allowed to travel at a speed $(2n-1)$ times as high as the recording speed ("n" being an arbitrary integer). In FIG. 6, the envelope wave forms (2), (4) and (6-a) are obtained with the rotary heads 3 and 4 coming into perfectly tracking (just tracking) positions, immediately after they come to the designated area, relative to the recording tracks formed by the heads 3 and 4 during recording. This is on the assumption that the track pitch is equal to the width of these heads.

In the case where the tape is allowed to travel at a speed (2n) times as high as the recording speed, if the rotary head 3 comes to trace in a just tracking state a plus azimuth recording track (formed by the head 3) when it comes into the designated area, the other rotary head 4 also comes to trace the plus azimuth track in the just tracking state when it comes to the designated area. Accordingly, the envelope wave forms of the heads 3 and 4 are in a complementary relation for the highest level of them. The envelope wave forms (1-a), (3-a) and (5-a) of FIG. 6 represent the reproduction outputs of the head 3 obtained with the head 3 coming to trace some of the recording tracks formed by the heads 3 in the just tracking state immediately after it comes into the designated area. Meanwhile, the envelope wave forms (1-b), (3-b) and (5-b) represent the reproduction outputs of the other head 4 obtained while the head 3 is in the just tracking state.

In FIG. 6, the left end of each of the envelope wave forms indicates the timing at which the head plunges into a designated area. The right end of it indicates the timing at which a tracing process on the designated area comes to an end. In other words, each of the envelope wave forms is obtained while the head 3 or 4 turns 36 degrees (1/300 sec). In the case of the data matrix shown in FIG. 5, the data are arranged to be recorded at a timing when the head 3 or 4 has turned 5 degrees after its entrace into the designated area. Assuming that the data of the column SYNC of FIG. 5 are 3-bit data, those of the column CRCC are 16-bit data and the rest are all 8-bit data, the ID0 and ID1 are recorded at a timing when the head 3 or 4 has turned (36×0.14) degrees after entrance into the designated area. The data ID2 and ID3 are recorded at a timing when the head has turned (36×0.39) degrees. The data ID4 and ID5 are recorded at a timing when the head has turned (36×0.64) degrees. These recording positions correspond to timing points A, B and C shown in FIG. 6.

In other words, the data ID0 and ID1 can be satisfactorily reproduced at a high level at the timing A as shown in FIG. 6. Preferably, the head is arranged to trace any of the tracks of the same azimuth angle at such a timing. Further, the data ID2 and ID3 can be adequately reproduced likewise at the timing B and the data ID4 and ID5 at the timing C. As apparent from the above, with the tape allowed to travel at a speed 2n times as high as the recording speed, the data which are in such a recorded position that gives a large reproduction output of the head 3 cannot be reproduced by the other head 4 to give a large reproduction output thereof. Therefore, in reproducing the ID data at a high travelling speed of the tape, it is disadvantageous to have the tape travel at a speed 2n times as high as the recording speed, because: The required ID data must be consecutively recorded in 4n tracks. Besides, during that period, it is impossible to change the mode of the ID data.

To avoid this disadvantage, the tape is allowed to travel at a speed (2n−1) times as high as the recording speed. This arrangement gives a large reproduction output at a desired timing. In case that the data X is alone desired to be reproduced, it suffices to reproduce only the data ID0 and ID1. In other words, with the tape travel speed set at a speed (2n−1) times as high as the recording tape speed, the heads 3 and 4 are arranged to come into the just tracking positions at the above-stated timing A for the tracks formed by them respectively. Then the data X can be accurately and promptly reproduced.

In the event of reproducing all the data ID0 to ID5, the embodiment operates as follows: As mentioned in the foregoing, the data ID0, ID2 and ID4 are recorded in positions spaced at a distance corresponding to the 9 degree turn of the rotary heads 3 and 4. Meanwhile, the data ID0 and ID1, the data ID2 and ID3 and the data ID4 and ID5 are respectively recorded at about the same positions. Therefore, the travelling speed of the tape is so selected in such a manner that the heads 3 and 4 traverse two tracks while they turn 9 degrees and these heads are arranged to come into the just tracking position at any one of the timing points A, B and C. Then, the just tracking positions can be automatically obtained also at the points of time other than the timing points A, B and C. The travelling speed of the tape that satisfies this condition is a speed $[2\times(180°/9°)\times m + 1]$ times, that is, $(40m+1)$ times as high as the recording speed (wherein "m" represents an integer).

In FIG. 6, the envelope wave form (6-b) is of a reproduction output obtained with the tape allowed to travel at a speed −39 times as high as the recording speed and the just tracking state arranged to be obtained at the timing point A. As apparent from the wave form shown, the reproduction outputs of the heads 3 and 4 reach their maximum values at all the timing points A, B and C. This indicates that all the data ID0 to ID5 can be adequately reproduced.

Figure 7:
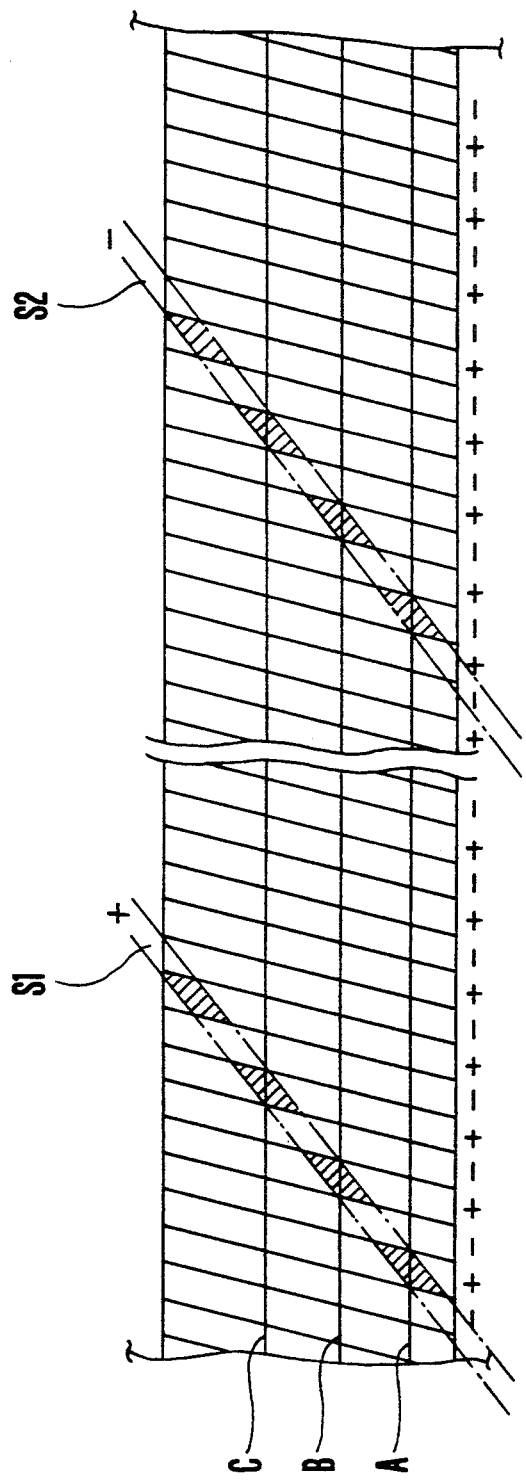
FIG. 7 is an illustration of ideal tracing loci of a head in relation to recording tracks.
Figure 8:
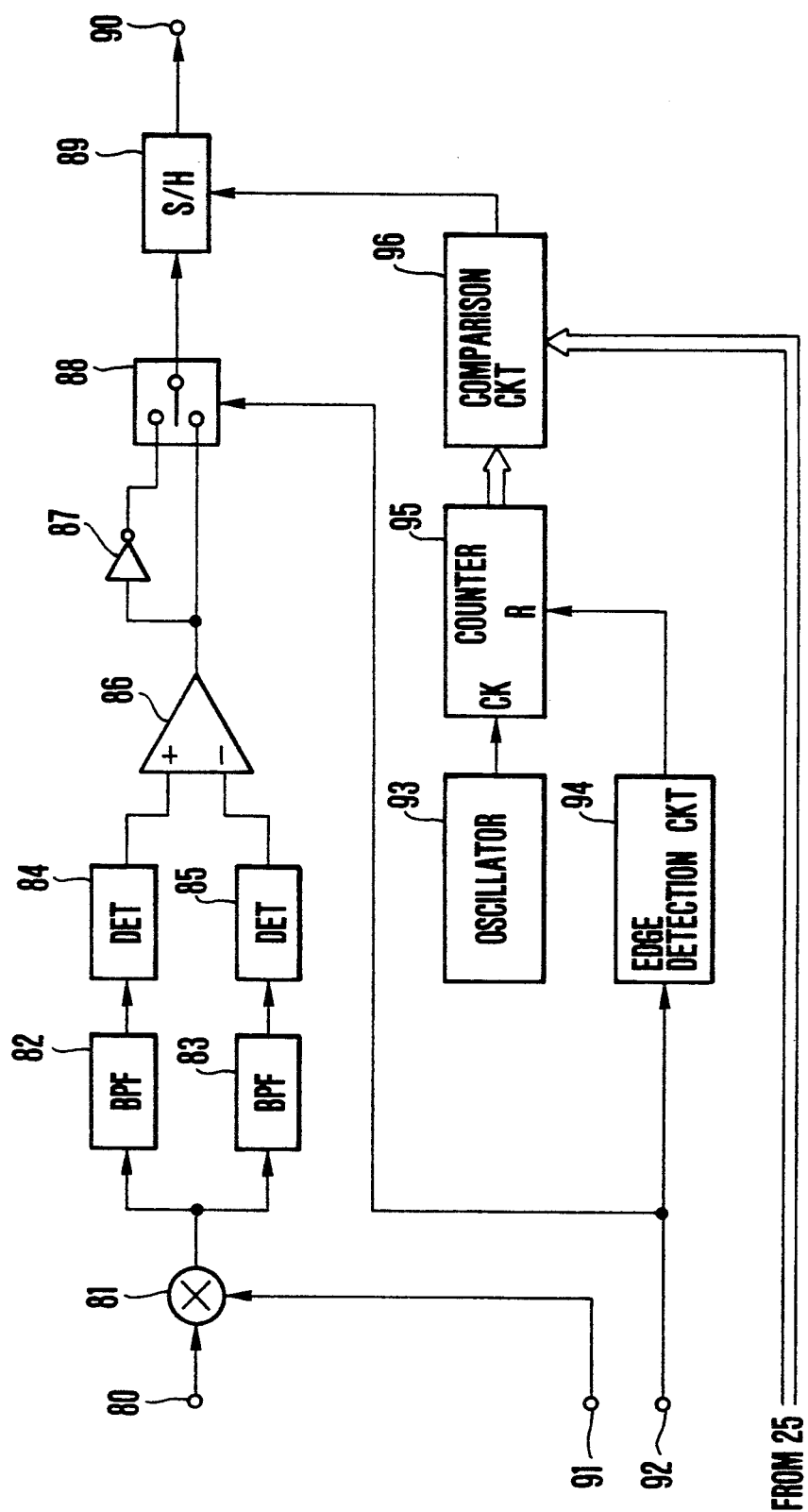
FIG. 8 is a circuit diagram showing by way of example the details of arrangement of an ATF circuit included in the embodiment shown in FIG. 4.

FIG. 7 shows the tracing loci of the heads 3 and 4 obtained in relation to the recording tracks when the envelope wave form (6-b) of FIG. 6 is obtained. The illustration of FIG. 7 includes a tracing locus S1 of the plus azimuth head; a tracing locus S2 of the minus azimuth head; oblique straight lines showing boundary lines between recording tracks; and lines A, B and C respectively showing the recorded positions of the data ID0 and ID1, the data ID2 and ID3 and the data ID4 and ID5 respectively. Hatched parts indicate parts from which reproduction outputs are obtainable. As apparent from FIG. 7, all the ID data can be reproduced. Specific circuit arrangement required for satisfactorily reproducing the ID data at such a high tape speed as mentioned above is described by way of example as follows:

FIG. 8 shows an example of details of the ATF circuit 37 included in the embodiment shown in FIG. 4. Referring to FIG. 8, a terminal 80 is arranged to receive the reproduced TPS's from the LPF 35. A terminal 91 is arranged to receive TPS's from the pilot signal generating circuit 32 in rotation in the same order of frequencies (f1→f2→f3→f4) as in the case of recording. Another terminal 92 is arranged to receive the PG signal. These incoming signals are processed through a signal processing circuit consisting of a multiplier 81, BPF's (band-pass filters) 82 and 83, detection circuits (DET's) 84 and 85, a comparator 86, an inverting amplifier 87 and a switch 88. Through this signal processing operation, a tracking error signal is obtained from the switch 88. The tracking error signal is sampled and held at a sample-and-hold circuit 89 and, after that, supplied to the capstan motor control circuit 20 via a terminal 90 for tape travel control. The tape travel control is performed in such a manner that the heads 3 and 4 are allowed to come to the just tracking state at the timing when the sample-and-hold circuit 89 performs the sample-and-holding operation thereof. The sample-and-holding operation timing is determined on the basis of data supplied from the system controller 25. The system controller 25 supplies a comparison circuit 96 with information on the designated area and the data which is determined by information on the result of a discrimination made between searching reproduction and normal reproduction.

An edge detection circuit 94 is arranged to detect the edges of the PG signal and to supply a pulse signal of 60 Hz to a counter 95. The counter 95 is arranged to count the pulses of a clock signal of a predetermined frequency which is supplied from an oscillator. The frequency of this clock signal is sufficiently larger than 60 Hz. The counted data of the counter 95 is compared by the comparison circuit 96 with the data supplied from the system controller 25 as mentioned above. When these data come to coincide with each other, the comparison circuit 96 supplies a pulse signal to the sample-and-hold circuit 89 as a sampling pulse.

Assuming that the clock signal is produced from the oscillator 93 at a frequency of 3 KHz and that, for normal reproduction, the tracking error signal is arranged to be sampled in the middle of each of the areas, the system controller 25 in that case produces 100X+50 data (wherein "X" represents an integer). In the event of allowing the tape to travel at a high speed, if the head is required to come into the just tracking state at the above-stated timing A, the data from the system controller 25 becomes 100X+14.

The ID data can be quite adequately reproduced in the above-stated manner. In this instance, the signal processing system for obtaining the tracking error signal is left completely unchanged. This is because the tape travel speed is assumed to be 4l+1 times (l represents an integer) as fast as the recording tape travel speed.

As obvious from the foregoing description, with the tracking error signal sampled at a timing related to the recorded position of desired ID data, the ID data can be reproduced without fail. The term "a timing related to the recorded position" is used here for the following reasons: It is one reason that the same effect may be attained by sampling the desired ID data at a tracing timing of the head computed from the tape travel speed. It is another reason that the desired ID data can be reproduced even if the head is not perfectly in the just tracking state. In other words, in case where the width of the head is considerably wider than the track pitch and the ID data is reproducible from a reproduction output obtained from a part of the tape about ½ of the track pitch, a comparatively wide degree of latitude may be allowable to the above-stated ideal timing.

A summary of description of the tape travel speed for searching is as follows: In reproducing the desired ID data without fail, the tape is allowed to travel at a speed an integer times as fast as the recording speed. In cases where a desired part of the record is to be more quickly detected or where it is desired to decrease the number of tracks in which the desired ID data are to be consecutively recorded, the tape is allowed to travel preferably at a speed (2n+1) times as fast as the recording speed. Further, if it is desired to introduce no modification in the design of the tracking control circuit arrangement, the tape is preferably allowed to travel at a speed (4l+1) times as fast as the recording speed. In the event that all the ID data (ID0 to ID5) in the above-stated ID data format are to be quickly reproduced, the tape is allowed to travel at a speed (40m+1) times as fast as the recording speed.

Figure 9:
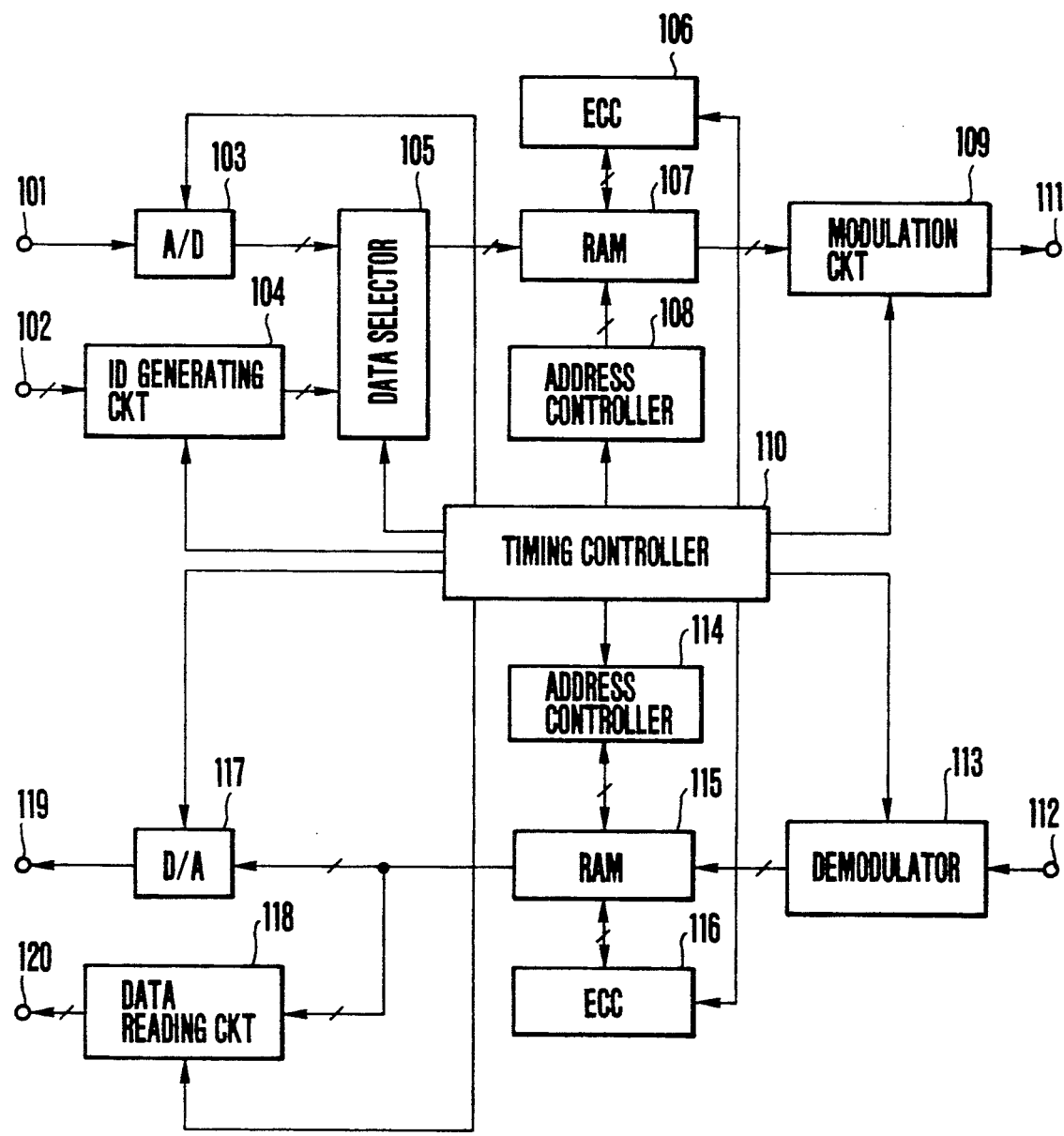
FIG. 9 is a circuit diagram showing by way of example the details of arrangement of a PCM audio signal processing circuit included in the embodiment shown in FIG. 4.

Further details of recording and reproduction arrangement for the ID signal are as follows: FIG. 9 shows by way of example the details of the PCM audio signal processing circuit 30 which is included in the embodiment shown in FIG. 4. In FIG. 9, the illustration includes a terminal 101 which is arranged to receive an incoming analog audio signal supplied to the terminal 29; and another terminal 102 is arranged to receive data produced from the ID control circuit 51. The ID control circuit 51 is arranged, as will be described in further detail later herein, to form ID data in the form of parallel data according to Tables 1 and 2 shown in the foregoing.

The parallel data received at the terminal 102 are supplied to an ID generating circuit 104. Then, these data are serialized at a predetermined timing and are produced from the ID generating circuit 104. Meanwhile, the analog audio signal which is received at the terminal 101 is supplied to an analog-to-digital converter 103 (hereinafter referred to as A/D converter). The A/D converter 103 is arranged to sample the analog audio signal at a predetermined frequency and, after that, to quantize it. The quantized signal is then supplied to a data selector 105 in the form of serial data of a predetermined timing. The data selector 105 is arranged to supply a RAM (random access memory) 107 with the output of the ID generating circuit 104 once in every one-field period at a timing corresponding to the data ID1. At other timings, the selector 105 supplies the output of the A/D converter 103 to the RAM 107. The RAM 107 arranges address data which are obtained from an address controller 108 including the parity word (P, Q), CRCC, etc, from an error correcting circuit 106 (hereinafter referred to as ECC) and the data which are obtained from the above-stated data selector 105 in such a manner that corresponds to the data matrix shown in FIG. 5. The RAM 107 supplies a modulation circuit 109 with the data which are time-base compressed in the order as mentioned in the foregoing. The modulation circuit 109 performs digital modulation such as BPM (by-phase modulation), etc. The digital modulation output of the circuit 109 is produced from a terminal 111. The digital modulated audio signal thus produced from the terminal 111 is supplied to the adder 33 as mentioned in the foregoing.

In the case of reproduction, a terminal 112 receives a digital modulated signal which comes via the gate circuit 28. The modulated signal is then demodulated by a digital demodulator 113. The demodulated signal is supplied to a RAM 115. The RAM 115 then performs a signal processing operation in a manner entirely reverse to that of the RAM 107. More specifically, the above-stated arrangement is changed on the basis of the address data obtained from an address controller 114 and synchronizing data and any error is corrected by an ECC 116. As a result, the data of the columns D1 and D2 which are thus obtained are produced from the RAM 115 and are supplied to a D/A (digital-to-analog) converter 117 and a data reading circuit 118 respectively. The D/A converter 117 restores the input into the original analog audio signal and produces it via terminal 119 and from the terminal 36. Meanwhile, the data reading circuit 118 picks up the above-stated ID data and supplies them to the ID detection circuit 52. The operations of all parts of the signal processing circuit 30 of FIG. 9 are synchronized with a timing signal produced from a timing controller 110.

The ID detection circuit 52 detects the ID data and supplies the system controller 25 with information which is as shown in Tables 1 and 2. This of course includes the above-stated track pitch information, which is supplied at least once in one sec to the system controller 25. The system controller 25 performs control over the area designation circuit 26 and the capstan motor control circuit 20 according to these data. In the event that, during reproduction in the SP mode, for example, if data indicative of that a signal is recorded in the designated area in the LP mode instead of the SP mode is supplied from the ID detection circuit 25, the system controller 25 controls the capstan motor control circuit 20 in such a way as to cause the rotating speed of the capstan reduced to ½ of the speed.

Further, during the above-stated searching reproduction, when the ID detection circuit supplies data indicative of a mute part, the system controller 25 controls the capstan motor control circuit 25 to bring the tape to a stop.

The sixth and seventh bits of the 8-bit data X are indicative of the track pitch. This track pitch indicating data is thus composed of two bits which permits selection of up to four different track pitches. However, for the sake of simplification of description, let us here consider recording and reproduction at only two different track pitches, that is, in either the LP mode or SP mode. Let us further assume that the track pitches of the LP and SP modes are in the ratio of 1:2 and that the head width of each of the heads 3 and 4 is 1.4 times as wide as the track pitch obtained in the LP mode.

Figure 10A:
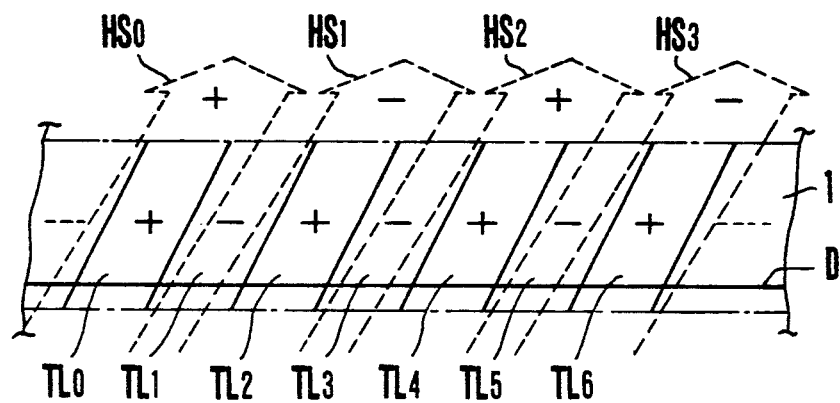
FIGS. 10A and 10B are illustrations showing the operating state of the same embodiment which takes place on a recording medium when the medium is allowed to travel at a speed different from a recording speed while recording tracks are traced by the embodiment.
Figure 10B:
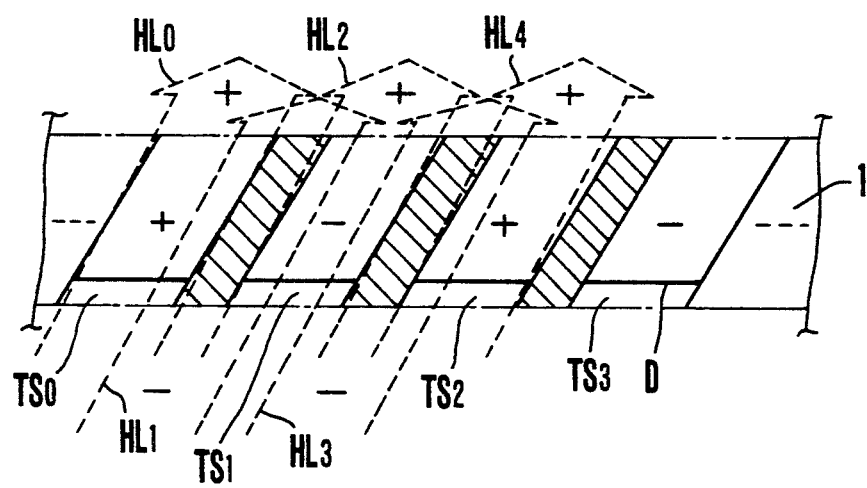

FIG. 10A shows the state of a designated area obtained on the tape 1 when the record in the recording tracks formed in the LP mode is reproduced in the SP mode. FIG. 10B, conversely, shows the state of a designated area obtained on the tape when the record in recording tracks formed in the SP mode is reproduced in the LP mode. Recording tracks TL0 to TL6 are formed respectively in the LP mode. These tracks are traced by the head for reproduction in the SP mode as indicated by tracing loci HS0 to HS3. Recording tracks TS0 to TS3 are formed in the SP mode. At the time of reproduction, these tracks are traced by the head in the LP mode as indicated by tracing loci HL0 to HL4. In these drawings, the signs + and − indicate whether each of the tracing loci is drawn by the head 3 which has an azimuth angle of $+\theta$ degrees or by the other head 4 which has an azimuth angle of $-\theta$ degrees. A line D indicates the recorded positions of the data ID0 and ID1 and that they are recorded at about the same position. Hatched parts indicate guard bands.

Referring to FIG. 10A, even if the above-stated 8-bit data X is recorded in the part D of the tracks TL1, TL2 and TL3, the data X is never picked up as apparent from FIG. 10A. Further, referring to FIG. 10B, even if the data X is recorded in the part D of the track TS1, the data X is likewise never picked up. Therefore, it is necessary to have the data X consecutively recorded in a certain number of tracks. In other words, the data X must be recorded in an N number of consecutive tracks and the groups of the N number of consecutive tracks must be uniformly included in the whole number of tracks. More specifically, in case that each track is of different azimuth angle from adjacent tracks; the track pitches of the LP and SP modes are in the ratio of 2:1; and the head width is approximately 1.4 times as wide as the track pitch of the LP mode, the data ID0 to ID5 are recorded in the mode 7 in four consecutive recording tracks among every 60 tracks in order that the data X is quickly and accurately picked up.

Here let us further discuss the above-stated N number of recording tracks to be used for consecutive recording of the data X which is indicative of the track pitch. Let us first consider a case where the condition of the azimuth angle is removed, that is, where the data is recorded within a zone free from the influence of the azimuth angle or where azimuth recording is not performed. If recording is made in the SP mode under this condition, let us assume that the data X is reproducible with the head width being wider than the track pitch of the LP mode and a reproduction signal is obtainable from a part at least ½ of the LP mode track pitch. In this instance, it is not necessary to have the data X recorded in consecutive tracks. Whereas, in the event of recording made in the LP mode under the same condition, the data X can be picked up if the data X is recorded in a number of consecutive tracks of the LP mode pitch that corresponds to the track pitch (hereinafter simply referred to as TP) of the SP mode.

In the event of taking the azimuth angle into consideration, if TP=2 m 0 (wherein m and 0 represent arbitrary integers), arrangement to have N=2 m 0 or more brings about no problem In case of TP=(2 m 0−1), there is some probability that the data X cannot be picked up even if N is arranged to be a large number It is therefore preferable to avoid the TP=(2 m 0−1) arrangement. Meanwhile, in case that the TP is not an integer and, for example, is generally expressed as TP=(m 1) / (m 2), arrangement for picking up the data X becomes as follows: In this instance, arrangement to have N=2 m 2 in the SP mode and N=2 m 1 in the LP mode enables to reproduce the data X without fail. However, this number N is on the assumption that the data X can be picked up without fail with the head width being equal to the LP mode track pitch and with the data X determined as to whether it is to be picked up or not at a ½ point of the LP mode track pitch. Therefore, the number N becomes smaller in the event of a wider head width or a multiplying rate close to (2 m 0). The number N thus depends evidently on the track pitch ratio of the SP and LP modes.

In cases where the embodiment is arranged to permit setting of three or more different track pitches, the number N of tracks is determined with two of these different track pitches assumed to be the SP mode track pitch and the LP mode track pitch Then, with reference made to the maximum value thereof, the data X can be picked up without fail.

Figure 11:
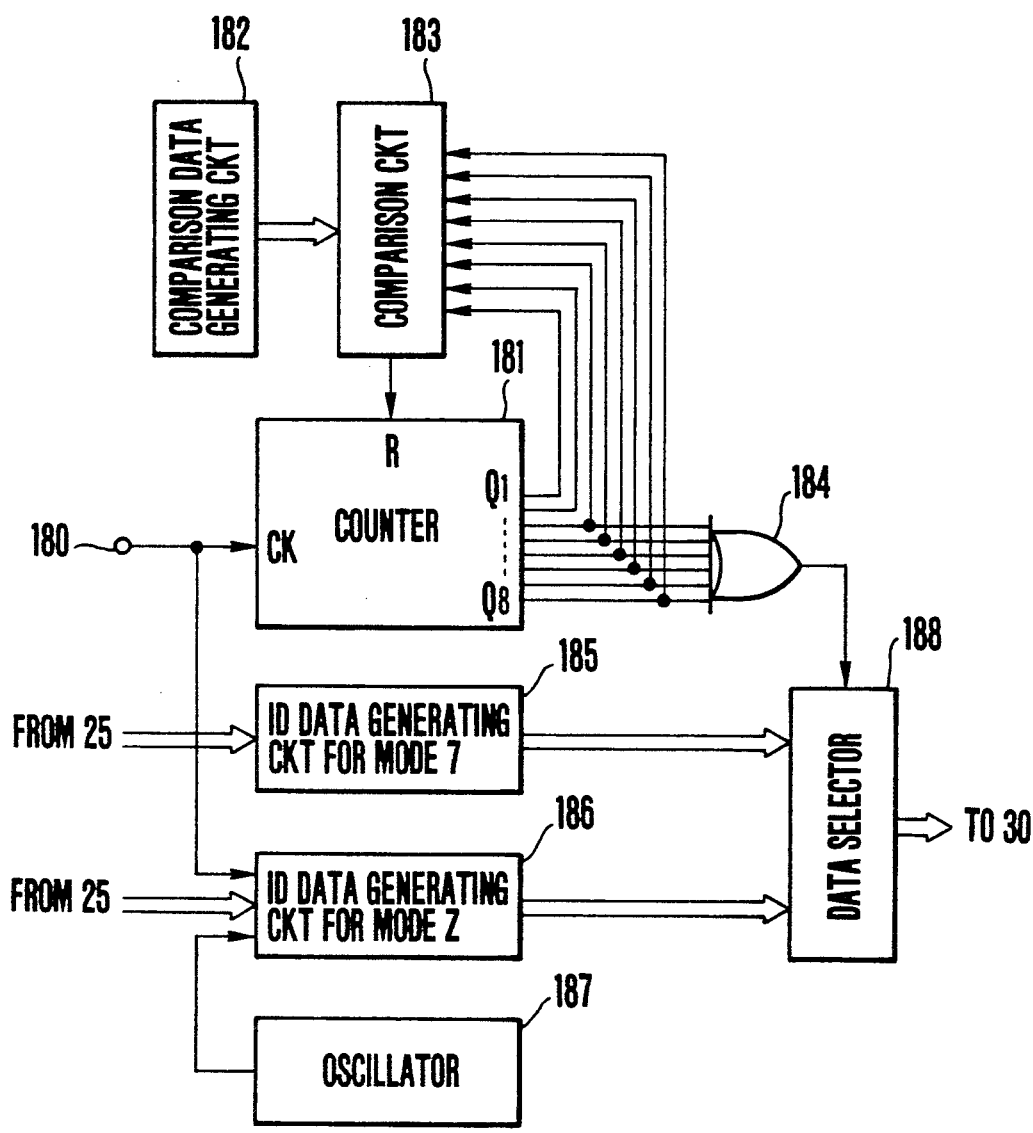
FIG. 11 is a circuit diagram showing by way of example the details of arrangement of an ID control circuit included in the embodiment shown in FIG. 4.

Assuming that, in this specific embodiment, the track pitches of the SP and LP modes are in the ratio of 2:1 and the width of both the heads 3 and 4 is 1.4 times wider than the track pitch of the LP mode, a detailed circuit arrangement required for consecutively recording the data ID0 and ID5 in their mode 7 in four of every 60 recording tracks is as described below:

FIG. 11 shows an example of arrangement of the ID control circuit 51 of FIG. 4. This illustration includes a terminal 180 which is arranged to receive the PG signal from the above-stated detector 11. The PG signal is then supplied to a counter 181 and a mode Z ID data generating circuit 186 respectively.

A circuit 185 for generating the ID data in the mode 7 is arranged to form the data of the mode 7 shown in Tables 1 to 2 on the basis of data obtained from the system controller 25 in accordance with a manual operation performed on the operation part 24. The data thus formed by the circuit 185 is supplied to a data selector 188 as one of the inputs of the selector. Meanwhile, the circuit 186 for generating the ID data in the mode Z is arranged to form the data selectively in one of the modes 1 to 6 shown in Tables 1 to 2 on the basis of data obtained from the system controller 25 according to the manual operation on the operation part 24 and corresponding to a mode designated by the operation part 24 and also on the basis of the clock signal which is produced at a predetermined frequency from an oscillator 187. The data thus formed is supplied to the other input terminal of the data selector 188. The counter 181 is arranged to count the PG signal. A counted value thus obtained is produced from the counter in a form consisting of bits from the least significant bit Q1 up to the most significant bit Q8. In this instance, during a four-field period during which the counted value of the counter 181 is between 0 and 3, the bits Q3 to Q8 are all at "0" and the output of an OR gate 184 is at a low level. While the output level of the OR gate 184 is low, the data selector 188 supplies the PCM audio signal processing circuit 30 with the data produced from the mode 7 ID data generating circuit 185.

When the counted value of the counter 181 becomes 4 or more, at least one of the bits Q3 to Q8 becomes "1" to cause the output level of the OR gate 184 to become high. This in turn causes the data selector 188 to supply the PCM audio signal processing circuit 30 with the data produced from the mode Z ID data generating circuit 186. When the counted value of the counter 181 reaches 60, the output of a comparison data generating circuit 182 coincides with the counted value of the counter 181. Then, a comparison circuit 183 produces a pulse signal. This pulse signal is supplied to the reset terminal of the counter 181. As a result, the counted value of the counter 181 comes back to zero. Following this, the output level of the OR gate 184 becomes low and remains low over a four-field period. With these processes repeated, the ID data of the mode 7 is obtained only during four consecutive field periods within 60 field periods. Meanwhile, during other 56 field periods, the ID data corresponding to applicable one of other modes 1 to 6 is obtained.

The tape recorder embodying this invention in the manner as described in the foregoing permits an accurate and prompt searching operation such as a discrimination between the SP mode and the LP mode, etc. without causing any problem such as lowered recording density or the like.

In the embodiment described, the information on the recording track pitch is recorded along with the PCM audio data. However, it is possible to have the track pitch information recorded in some other suitable manner such as frequency multiplexing, etc. Further, in the case of the embodiment described, this invention is applied to the tape recorder of the kind arranged to form six longitudinal areas extending along the length of the tape and to form recording tracks one after another in each of these areas. However, the application range of this invention is not limited to the tape recorder of this kind but also includes the VTR's, DAT's, etc. of the known kinds.

While two heads are used in the embodiment described, the same advantageous effects are of course attainable with this invention applied to a different system in which heads are separately arranged for each of the different track pitches to make the tracking error signal more easily obtainable and to obtain the highest S/N ratio for each of the track pitches.

What is claimed is:

1. A rotary head type recording and reproducing apparatus, comprising:
   a) recording means for recording signals while forming many recording tracks in parallel on a tape-shaped recording medium, said signals including main digital information codes and additional codes in a time sharing manner, said recording means being arranged to record said additional codes at a predetermined part in each of said tracks, and to record said main digital information codes at another part in each of said tracks, and said additional codes including a code indicative of a track pitch of said recording tracks;
   b) reproducing means for reproducing signals from said recording medium, said reproducing means including at least one rotary head;
   c) means for forming a tracking error signal by using signals reproduced by said rotary head;
   d) sampling means for periodically sampling said tracking error signal only at timings within a period during which said rotary head traces the predetermined part; and
   e) control means for controlling a relative position of said recording medium and said rotary head according to said tracking error signal sampled by said sampling means.

2. A rotary type recording and reproducing apparatus, comprising:
   a) recording means for recording signals while forming many recording tracks in parallel on a tape-shaped recording medium, said signals including main digital information codes and additional codes in a time sharing manner, said recording means being arranged to record said additional codes at a predetermined part in each of said tracks, and to record said main digital information codes at another part in each of said tracks, and said additional codes including a code indicative of a direction in which said tape-shaped recording medium travels;
   b) reproducing means for reproducing signals from said recording medium, said reproducing means including at least one rotary head;
   c) means for forming a tracking error signal by using signals reproduced by said rotary head;
   d) sampling means for periodically sampling said tracking error signal only at timings within a period during which said rotary head traces the predetermined part; and
   e) control means for controlling a relative position of said recording medium and said rotary head according to said tracking error signal sampled by said sampling means.

3. A rotary head type recording and reproducing apparatus, comprising:
   a) recording means for recording signals while forming many recording tracks in parallel on a tape-shaped recording medium, said signals including main digital information codes and additional codes, said recording means being arranged to record said additional codes at a predetermined part in each of said tracks, and to record said main digital information codes at another part in each of said tracks;
   b) reproducing means for reproducing signals from said recording medium, said reproducing means including at least one rotary head;
   c) moving means which is capable of longitudinally moving said tape-shaped recording medium at a first speed and at a second speed which is faster than said first speed;
   d) means for forming a tracking error signal by using signals reproduced by said rotary head;
   e) sampling means for periodically sampling said tracking error signal only at timings within a period during which said rotary head traces the predetermined part;
   f) control means for controlling a relative position of said recording medium and said rotary head according to said tracking error signal sampled by said sampling means; and
   g) mode setting means for setting the apparatus between a plurality of modes including first and second modes, in which in said first mode, said moving means moves said recording medium at the first speed and said reproducing means reproduces said main digital information codes and said additional codes, while in said second mode, said moving means moves said recording medium at the second speed, said reproducing means reproduces only said additional codes, and said sampling means samples said tracking error signal at a timing within a period during which said rotary head traces the predetermined part.

4. An apparatus according to claim 3, wherein said plurality of modes further includes a third mode in which said recording means is in operation and said moving means moves said recording medium at the first speed.

5. An apparatus according to claim 3, wherein said predetermined part in each of said tracks is in alignment with others in a longitudinal direction of said tape-shaped recording medium.

6. An apparatus according to claim 5, wherein said predetermined part includes a first position in each of said tracks and a second position which differs from said first position relative to a longitudinal direction of said track.

7. An apparatus according to claim 6, wherein said second speed enables said rotary head to trace said recording medium simultaneously covering said first position in one of said tracks and said second position in another track located adjacent to said one of tracks.

8. An apparatus according to claim 3, wherein said recording means is arranged to further record a pilot signal for tracking control; and said tracking error signal forming means is arranged to form said tracking error signal by using said pilot signal reproduced by said rotary head.

9. An apparatus according to claim 8, wherein said tracking control pilot signal includes pilot signals of four different frequencies; and said recording means records the pilot signals of said four different frequencies in rotation, one in every track, in a predetermined order.

10. An apparatus according to claim 3, wherein said recording means performs recording by forming many parallel recording tracks in each of a plurality of areas having a same width longitudinally extending along the length of said tape-shaped recording medium.

11. An apparatus according to claim 10, wherein said reproducing means is capable of reproducing said main digital information codes from each plurality of areas.

12. An apparatus according to claim 3, wherein in said first mode said sampling means samples said tracking error signal at a different timing from said timing in said second mode.

13. A rotary head type recording and reproducing apparatus, comprising:
   a) recording means for recording signals while forming many recording tracks in parallel on a tape-shaped recording medium, said signals including main digital information codes and additional codes, said recording means being arranged to record said additional codes at a predetermined part in each of said tracks, and to record said main digital information codes at another part in each of said tracks;
   b) reproducing means for reproducing signals from said recording medium, said reproducing means including at least one rotary head;
   c) moving means which is capable of longitudinally moving said tape-shaped recording medium at a first speed and at a second speed which is faster than said first speed;
   d) means for forming a tracking error signal by using signals reproduced by said rotary head;
   e) sampling means for sampling said tracking error signal;
   f) control means for controlling a relative position of said recording medium and said rotary head according to said tracking error signal sampled by said sampling means; and
   g) mode setting means for setting the apparatus between a plurality of modes including a first and second modes, in which in said first mode, said moving means moves said recording medium at the first speed and said sampling means samples said tracking error signal at a first timing, while in said second mode, said moving means moves said recording medium at the second speed and said sampling means samples said tracking error signal at a second timing when said rotary head traces the part at which said additional codes are recorded, said second timing being different from said first timing.

14. A rotary head type recording and reproducing apparatus comprising:
   a) recording means for recording signals while forming many recording tracks in parallel on a tape-shaped recording medium, said signals including main digital information codes and additional codes, said recording means being arranged to record said additional codes at a predetermined part in each of said tracks, and to record said main digital information codes at another part in each of said tracks;
   b) reproducing means for reproducing signals from said recording medium, said reproducing means including at least one rotary head;
   c) moving means which is capable of longitudinally moving said tape-shaped recording medium;
   d) means for forming a tracking error signal by using signals reproduced by said rotary head;
   e) sampling means for sampling said tracking error signal;
   f) control means for controlling a relative position of said recording medium and said rotary head according to said tracking error signal sampled by said sampling means; and
   g) mode setting means for setting the apparatus between a plurality of modes including a first and second modes, in which in said first mode, said reproducing means reproduces said main digital information codes and said additional codes and said sampling means samples said tracking error signal at a first timing, while in said second mode, said reproducing means reproduces only said additional codes, and said sampling means samples said tracking error signal at a second timing when said rotary head traces the part at which said additional codes are recorded, said second timing being different from said first timing.

* * * * *

UNITED STATES PATENT AND TRADEMARK OFFICE
CERTIFICATE OF CORRECTION

PATENT NO. : 5,148,331
DATED : September 15, 1992
INVENTOR(S) : Motokazu Kashida, et al.

It is certified that error appears in the above-identified patent and that said Letters Patent is hereby corrected as shown below:

TITLE PAGE
Item [63]. Change "820,680" to -- 820,689 --
Item [57], line 9. Change ";" to -- : --
Col. 1, line 52. Change "overwite" to -- overwrite --
Col. 6, line 24. After "cylinder" insert -- 2 --
Col. 7, line 17. After "in" insert -- the --
Col. 8, line 1. Change "from" to -- form --
Col. 9, line 21. After "of" insert -- the --
Col. 9, line 48. Change "case" to -- cases --
Col. 11, line 3. Change "entrace" to -- entrance --
Col. 13, line 7. Change "41" to -- 4$\ell$ -- and change "1" to -- $\ell$ --
Col. 13, line 20. After "in" insert -- a --
Col. 13, line 38. Change "41" to -- 4$\ell$ --
Col. 14, line 46. Change "sec" to -- sec. --

Signed and Sealed this

Twenty-first Day of September, 1993

Attest:

BRUCE LEHMAN

*Attesting Officer*  *Commissioner of Patents and Trademarks*